US012519907B2

(12) United States Patent
Boivin

(10) Patent No.: US 12,519,907 B2
(45) Date of Patent: Jan. 6, 2026

(54) SYSTEM AND METHODS FOR ENHANCED VIDEOCONFERENCING

(71) Applicant: Mirametrix Inc., Montreal (CA)

(72) Inventor: Michel Boivin, Montreal (CA)

(73) Assignee: Mirametrix Inc., Montreal (CA)

( * ) Notice: Subject to any disclaimer, the term of this patent is extended or adjusted under 35 U.S.C. 154(b) by 163 days.

(21) Appl. No.: 18/295,515

(22) Filed: Apr. 4, 2023

(65) Prior Publication Data

US 2023/0319234 A1   Oct. 5, 2023

Related U.S. Application Data

(63) Continuation of application No. PCT/CA2021/051393, filed on Oct. 5, 2021.

(60) Provisional application No. 63/087,759, filed on Oct. 5, 2020.

(51) Int. Cl.
*H04N 7/15* (2006.01)
*G06F 21/32* (2013.01)
*G06V 20/20* (2022.01)
*G06V 40/16* (2022.01)

(52) U.S. Cl.
CPC ............ *H04N 7/157* (2013.01); *G06F 21/32* (2013.01); *G06V 20/20* (2022.01); *G06V 40/165* (2022.01); *H04N 7/155* (2013.01)

(58) Field of Classification Search
None
See application file for complete search history.

(56) References Cited

U.S. PATENT DOCUMENTS

| | | | | |
|---|---|---|---|---|
| 9,961,302 | B1* | 5/2018 | Henderson | H04N 7/152 |
| 10,666,902 | B1* | 5/2020 | Mahendru | G06F 9/45558 |
| 2015/0179186 | A1* | 6/2015 | Swierk | G10L 25/60 |
| | | | | 704/276 |
| 2016/0134840 | A1* | 5/2016 | McCulloch | G06V 40/165 |
| | | | | 348/14.03 |
| 2017/0127022 | A1* | 5/2017 | Li | H04N 7/15 |
| 2017/0351476 | A1 | 12/2017 | Yoacum | |
| 2018/0109570 | A1* | 4/2018 | Kowal | H04L 65/403 |
| 2018/0300927 | A1* | 10/2018 | Hushchyn | G06V 40/167 |
| 2018/0335929 | A1 | 11/2018 | Scapel et al. | |
| 2020/0106988 | A1* | 4/2020 | Harpur | G06V 10/82 |
| 2020/0349429 | A1* | 11/2020 | Vendrow | H04N 7/15 |

OTHER PUBLICATIONS

Salazar, M.; International Search Report issued in connection with corresponding PCT Application No. PCT/CA2021/051393; search completed Nov. 30, 2021.

* cited by examiner

*Primary Examiner* — Duc Nguyen
*Assistant Examiner* — Assad Mohammed
(74) *Attorney, Agent, or Firm* — Blake, Cassels & Graydon LLP; Christopher N. Hunter; Laurie Wright

(57) ABSTRACT

A system and associated methods are provided for enhancing videoconferencing interactions between users. The methods comprise obtaining user biometric data, converting said biometric data into a virtual representation of a user and embedding said virtual representation of the user into remotely shared media content.

24 Claims, 10 Drawing Sheets

SYSTEM AND METHODS FOR ENHANCED VIDEOCONFERENCING

CROSS-REFERENCE TO RELATED APPLICATIONS

The present application is a continuation of International PCT Application No. PCT/CA2021/051393 filed on Oct. 5, 2021, which claims priority from U.S. Provisional Application No. 63/087,759 filed on Oct. 5, 2020, both incorporated herein by reference in their entireties.

TECHNICAL FIELD

The following relates to systems and methods for enhanced videoconferencing, particularly for user detection and tracking.

BACKGROUND

Remote work, study or even socializing has never been more important than in 2020. One of the realities of the COVID-19 pandemic has been the necessity, wherever possible, of operating remotely and interacting virtually. With this reality also came a new set of problems and challenges, adding to the existing ones which were never so obvious as since videoconferencing became the main human interaction paradigm in 2020.

Many available solutions have a confusing interface and a steep feature learning curve, especially for anything that goes beyond voice and video. More advanced features like screen sharing and remote presentations, for example, lack immersion and the means for the presenter to receive any non-verbal audience feedback to gauge engagement.

Some remote work tools focus on messaging rather than voice and audio, and thus the available videoconferencing features are limited. In other cases, features like picture-in-picture for screen sharing and webcam feed require extensive setup and navigating a complicated interface.

Privacy also becomes an issue when relying on videoconferencing for extended periods of time from home. Working with green screen backgrounds is not a widely available option, and only a handful of videoconferencing services provide a background removal feature.

Another shortcoming in today's videoconferencing landscape is the feature of exclusivity that locks users in a particular service, while not necessarily providing a full feature stack. For instance, one service can offer screen sharing and whiteboard functionality but not webcam overlay (picture-in-picture) or background removal/blurring.

The ability to access key videoconferencing features independent from (or complimentary to) a given videoconferencing service can increase productivity, reduce the user learning curve of advanced features, increase remote collaboration immersion and interaction, to name just a few advantages.

It is recognized herein that it is desirable to provide improved systems and methods for videoconferencing.

BRIEF DESCRIPTION OF THE DRAWINGS

Embodiments will now be described by way of example only with reference to the appended drawings wherein.

DETAILED DESCRIPTION

Figure 1:
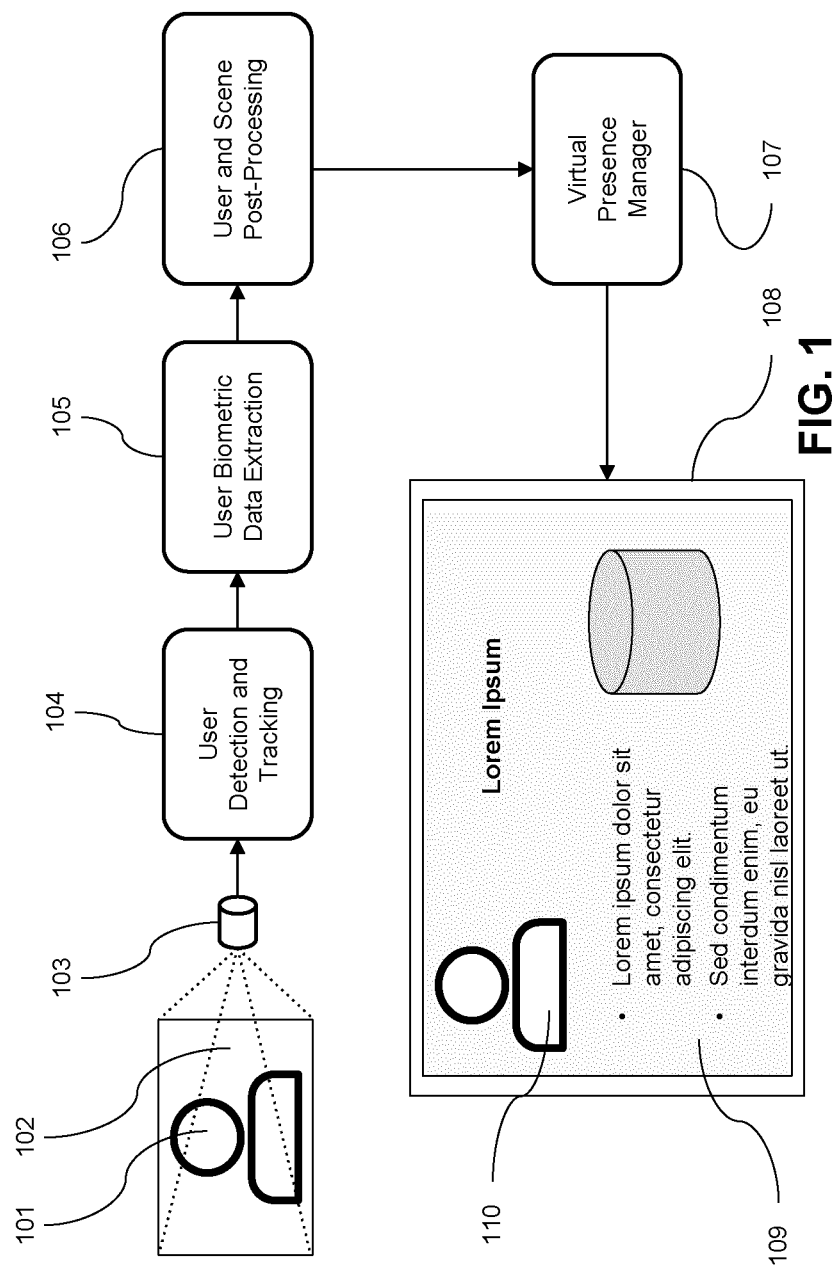
FIG. 1 is a block diagram exemplifying a user being imaged by the imaging module, with the resulting image data being sent to a series of user detection, tracking and biometric data extraction. The extracted user biometric data is then post-processed together with the user scene, as images by the imaging module. The user foreground and background visual data is then processed by a virtual presence manager which creates a virtual representation of the user in order to enhance videoconferencing modes.

It is the object of the following to provide systems and methods for enhanced videoconferencing. The present application describes a system and associated methods for providing enhanced videoconferencing through detection and tracking of at least one aspect of the user's body, face, eye or gaze. The systems and methods provided herein can be applied to, for example, facilitate interactions between presenter and audience during a virtual presentation.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will also be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been recognized that with all the advantages that videoconferencing has to offer, some of its disadvantages have never been so obvious as in 2020, when in many cases, working or studying remotely has been the only alternative. Disadvantages of the existing videoconferencing solutions include, but are not limited to insufficient audience immersion, lack of privacy, and non-intuitive features (such as screen sharing or privacy controls).

FIG. 1 illustrates a system comprising an imaging module 103 which provides an image feed of a scene 102 containing at least one aspect of a user's 101 body, face, eye or gaze. The system further comprises a user detection and tracking unit 104 which receives the image feed from the imaging module 103. The user detection and tracking unit 104 is configured to run a collection of machine executable algorithms for detecting and tracking the user's body, face, eye or gaze. Following the detection and tracking of the user's body, face, eye or gaze, the user detection and tracking unit 104 outputs a set of user features. The set of user features may include, without limitation, face contour landmarks, mouth and nose landmarks, eye contour landmarks, and pupil and iris landmarks. The set of user features can be processed by a user biometric data extraction unit 105 in order to extract user-specific characteristics. The set of user-specific characteristics may include, but is not limited to, six degrees of freedom (6DoF) head pose information, eye position, eye openness, three-dimensional gaze data, and user identity. Following the user biometric data extraction step 105, the user 101 and the surrounding scene 102, as captured by the imaging module 103, can be passed on to a user and scene post-processing unit 106. The user and scene post-processing at unit 106 may include without limitation, user background blurring, user background removal or user image enhancement (such as denoising, resolution upscaling, etc.). In this context, the scene 102 may comprise two main types of visual information. The user foreground which only contains the visual representation of the user 101 as captured by the imaging module 103 and segmented from the scene 102 based on the detection and tracking data from unit 104. And the user background which includes everything else in the scene 102 which is not the user foreground. The output of the user and scene post-processing unit 106 can be passed to a virtual presence manager 107 which can fuse a user foreground 110 with shared content 109 as part of a remote content framework 108.

Figure 2:
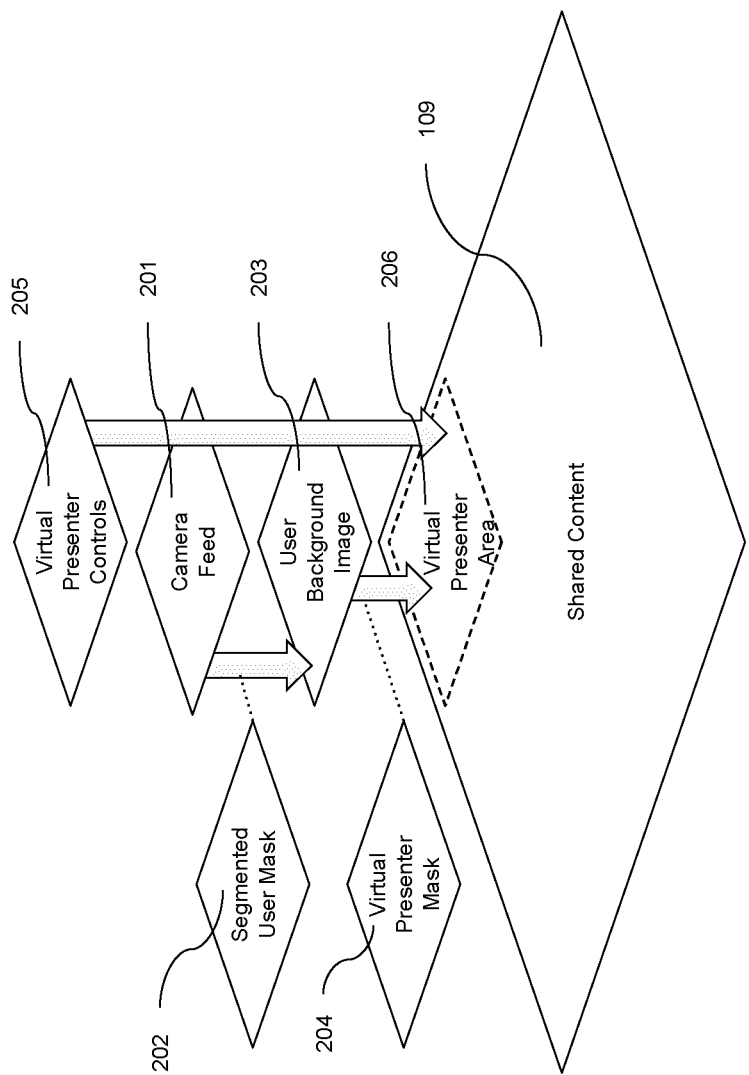
FIG. 2 exemplifies the processing steps performed on the user and the surrounding scene, as captured by the imaging module, in order to create and embed a virtual representation of the user into remotely shared content.

Turning to FIG. 2, the user and scene post-processing unit 106 together with the virtual presence manager 107 can perform the following steps in order to generate the remote content framework 108: the segmented user mask 202, as obtained in the user and scene post-processing step 106, is applied on the original camera feed 201 in order to obtain the user background image 203, which is the used in conjunction with the virtual presence mask 204 to produce the user foreground. The user foreground 110 and the associated virtual presenter controls 205 are added to the virtual presenter area 206 and fused with the shared content 109 in order to produce the final, remote content framework 108.

By way of example, the virtual presenter controls 205 may provide options to adjust the virtual presenter area 206 within the remote content framework 108, such as: zooming, resizing, moving horizontally and/or vertically, resizing or closing. Additional virtual presenter controls may include pausing the live video feed of the user foreground 110, replacing it with a still frame of the user 101 or a user avatar.

Figure 3:
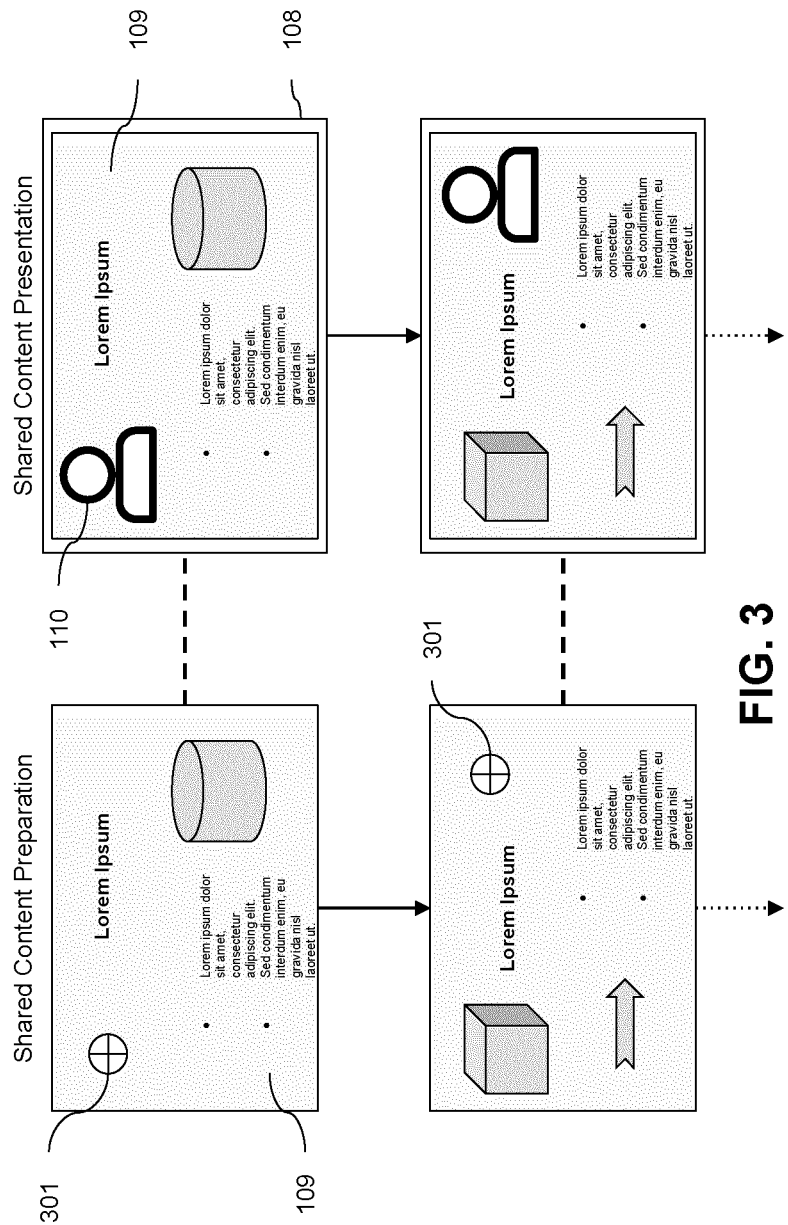
FIG. 3 illustrates one possible way of selecting the spatial positioning of the virtual user persona when embedding it into shareable media content.

In one embodiment, the virtual presenter area 206 can be dynamically positioned based on the temporal evolution of the shared content 109. By way of example, this can be done by using a predefined virtual presence placeholder 301 (see FIG. 3) to mark the desired position of the virtual presenter area 206 on each frame of the shared content 109. The virtual presence placeholder 301 is predefined such that it can be detected in real time using a dedicated computer vision algorithm. The detection of the predefined virtual presence placeholder 301 and its dynamic replacement with the user foreground 110 is performed as part of the virtual presence manager 107.

In another embodiment, the user foreground 110 and the associated virtual presenter area 206 are dynamically positioned based on the temporal evolution of the shared content 109 using active user 101 inputs. By way of example, such inputs may be provided via the keyboard, the mouse or through user head, gaze or hand gestures, as extracted by the user biometric data extraction unit 105. The inputs can either toggle positioning between predefined areas within the shared content area 109 or also indicate the position within the shared content area 109. The positioning in the latter case can be indicated through the user's 101 gaze, head pointing, gesture pointing, keyboard arrow navigation or mouse pointer position.

Figure 4:
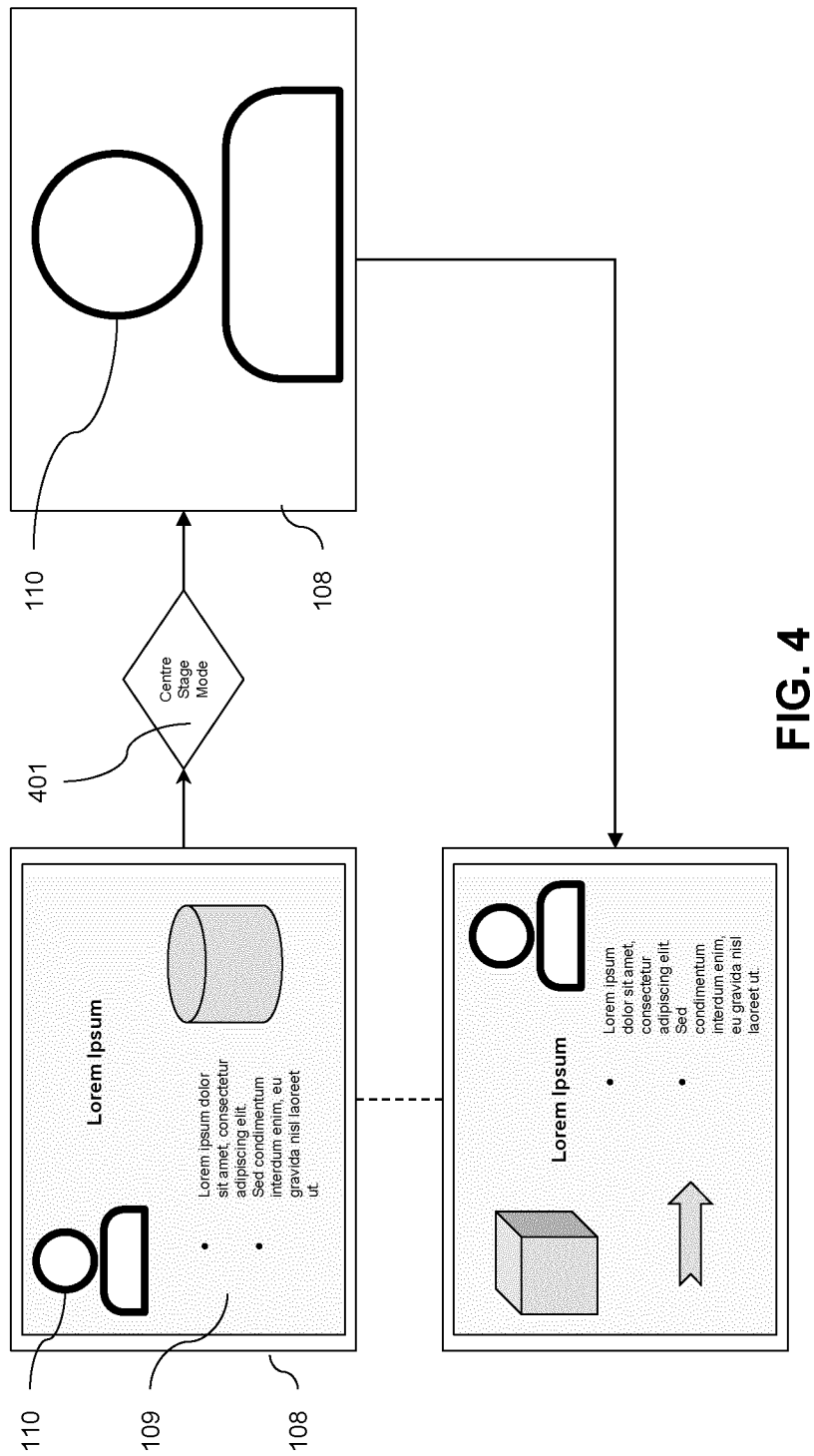
FIG. 4 is an example of the user virtual persona transitioning to a center stage mode when presenting remotely shared content and transitioning back to a presentation mode, after receiving a user biometric input.

In yet another embodiment, the user can trigger in real-time, the virtual presenter center state mode. A center stage mode 401 (see FIG. 4) can dynamically switch the remote content framework 108 from showing the virtual presenter 110 overlaid with the shared content 109 to only including the virtual presenter 110. By way of example, the center stage mode 401 is triggered by the user using a manual keyboard or mouse input, or a biometric input such as gaze, head pose, user distance with respect to the imaging module 103.

The center stage mode 401 is designed to increase audience immersion and facilitate a more natural presenter-audience interaction. Using the center stage 401 mode can help the presenter better engage the audience and better emphasize parts of the presentation and its message.

Figure 5:
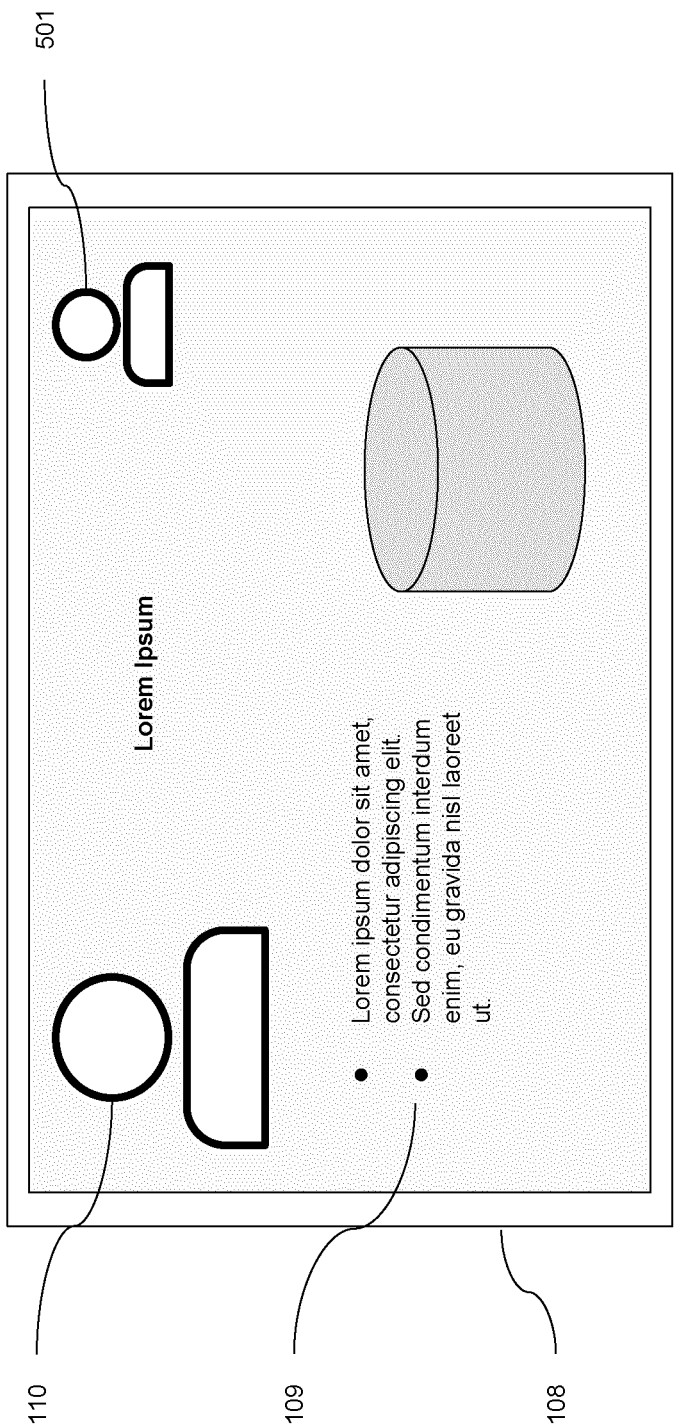
FIG. 5 is an example of remote presenter-audience immersive interaction, where a member of the remote audience is detected as asking the presenter a question and both their virtual personas are embedded into the shared content for increased visual context.
Figure 6:
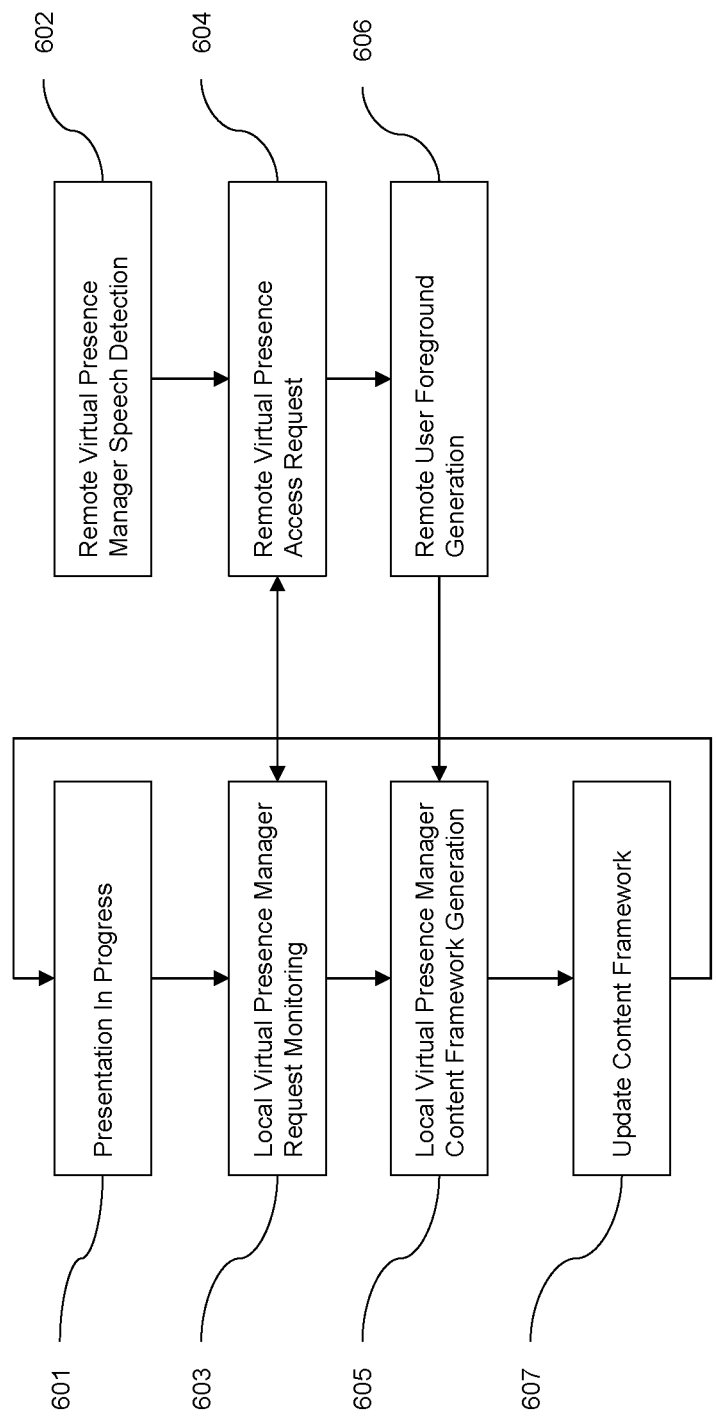
FIG. 6 is a flowchart illustrating an example of computer executable instructions performed by the system when providing the remote presenter-audience immersive interaction function.

In one embodiment, the systems and methods for enhanced videoconferencing can work over a decentralized network, where each connected user endpoint runs the methods for enhanced videoconferencing locally. When a member of the audience, represented by any of the connected users that are not the presenter 110, asks a question the virtual presence manager 107 on the presenter side creates a second virtual presence 501 (FIG. 5) of the audience member asking the question, within the remote content framework 108. With reference to FIG. 6, from the perspective of the presenter 110 as the local endpoint, while the presentation is in progress 601, a member of the audience, as the remote endpoint, is detected by their local system as talking 602. Their remote virtual presence manager issues an access request 604 to the local virtual presence manager 603. Upon acknowledging the request 604, the local virtual presence manager then requests the remote endpoint for the remote user foreground data 606. Using the remote user foreground data received by the local virtual presence manager the local content framework is generated 605 and the presentation is updated 605 to include both active participants. By way of example, the speech detection can be performed using visual speech recognition, as part of the user biometric data extraction unit 105, a connected audio input device or a combination thereof.

Figure 7:
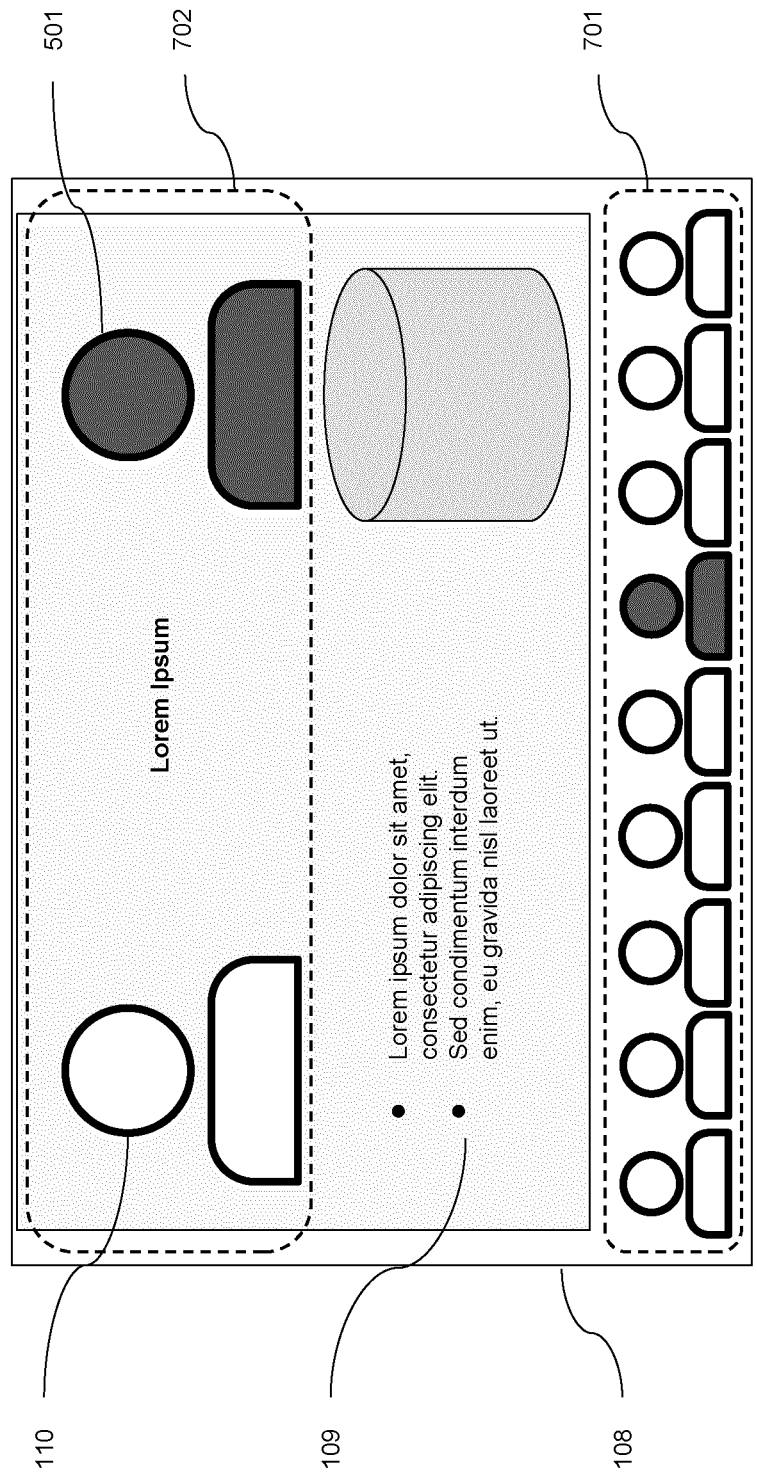
FIG. 7 is an example of the shared center stage mode, between the presenter and a member of the audience, when the member of the audience interacts with the presenter. When there are no audience interactions, the presenter operates either in default virtual presenter overlay view or in the presenter-only center stage mode. Also, at all times, the audience is visible to the presenter as an overlay either at the bottom or the top of the shared content framework.

In an alternative embodiment, the systems and methods for enhanced videoconferencing can work over a decentralized network, where each connected user endpoint runs the methods for enhanced videoconferencing locally. In this embodiment, the immersive experience is further augmented by providing the presenter 110 with a view of the audience 701 (FIG. 7). The audience view 701 is provided to the presenter 110 as a separate overlay within the content framework 108, either below or above the shared content area 109. By default, the audience view 710 is only visible to the presenter 110. When an audience member 501 interacts with the presenter, the virtual presence manager 107 on both sides (audience member and presenter) communicate via the decentralized network and provide a shared center stage view of both the presenter 110 and the audience member 501. The shared center stage view 702 is visible to both the presenter 110 and the audience 701.

Figure 8:
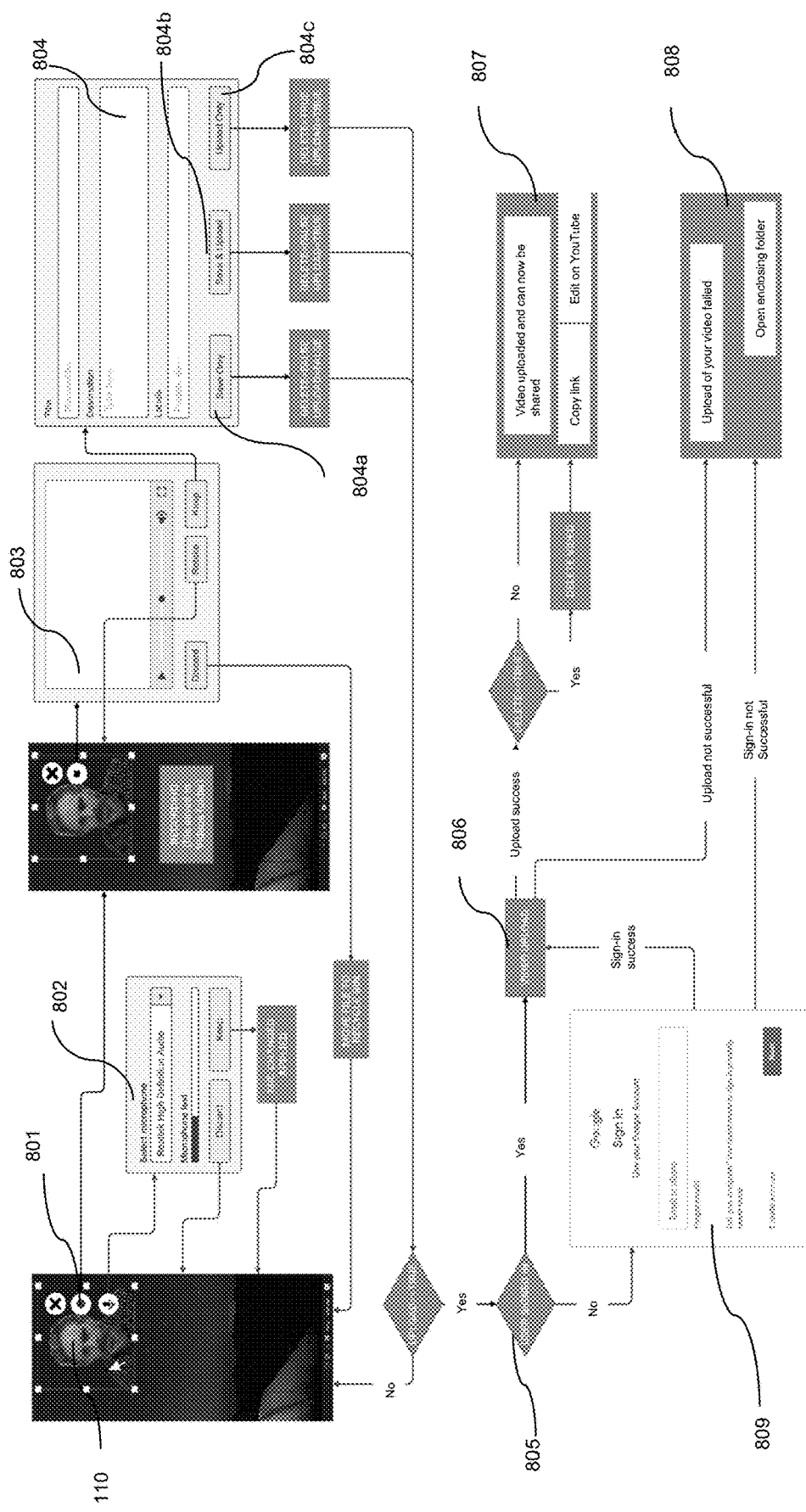
FIG. 8 is a flowchart illustrating an example of computer executable instructions performed by the system for providing recording and distribution of shared content with embedded virtual presenter features and functionality.

In yet another embodiment, the system and methods for enhanced videoconferencing can be used to record media content for later distribution. By way of example and without limitation, the media content may include presentations, screen shared tutorials, and video. In one general embodiment (FIG. 8), the user can adjust the size and placement of the embedded virtual presenter 110 as well as access basic recording controls 801 such as microphone or recording start/stop. Within the basic recording controls 801, the user can test and change the microphone settings 802 before starting to record the offline content. The offline virtual presenter functionality allows the user to control content playback by way of the graphical user interface (GUI) 803. In its most basic embodiment, the content playback GUI 803 allows the user to: (1) retake the whole recorded video content, or to start over from a set time stamp; (2) discard the recorded video content altogether; (3) playback the recorded video content in a standard video player functionality (adjust volume, toggle between window view and full screen or manually jump at different time stamps using the playback progress bar) or (4) save the recorded video content. When the user opts to save the recorded video content for offline distribution, in the most basic embodiment, the content distribution GUI 804 presents the user with three options: (a) to save the recorded content locally or in the cloud 804a, (2) to save the recorded content locally or in the cloud and to upload the content to a video distribution platform of their choice 804b, or (3) to upload the recorded content to a video distribution service without saving it locally or in the cloud 804c. When the user chooses either of the options 804b or 804c, the virtual presence manager 107 performs a check for access to a video distribution platform 805. If the user has already configured the access to a video distribution platform of their choosing, the recorded video content is seamlessly uploaded in the background 806 by the virtual presence manager 107. Upon completion, the virtual presence manager 107 notifies the user on the upload status. In the basic embodiment, a successful upload prompts the user via the virtual presence manager 107 with a sharable link to the uploaded video content and with the option to further edit the uploaded video directly within the video distribution platform 807. In case of an unsuccessful upload, the same virtual presence manager 107 can notify the user of the upload failure while providing the option to access a local copy of the recorded video content 808. If during the upload process, the virtual presence manager 107 fails to connect to any video distribution platforms, it can present the user with the option to select a video distribution platform and sign in 809.

In another embodiment, the virtual presence manager 107 can be configured to provide privacy features for the presenter. By way of example, such privacy features may include, but not be limited to: muting the audio of the presenter when the user 101 is looking away from the camera 103 for a set amount of time; muting the audio when the user 101 moves away from the camera 103 beyond a predefined threshold; or removing any other user in the scene 102, as captured by the imaging device 103, based on the biometric identification of user 101 as the authenticated user.

Figure 9:
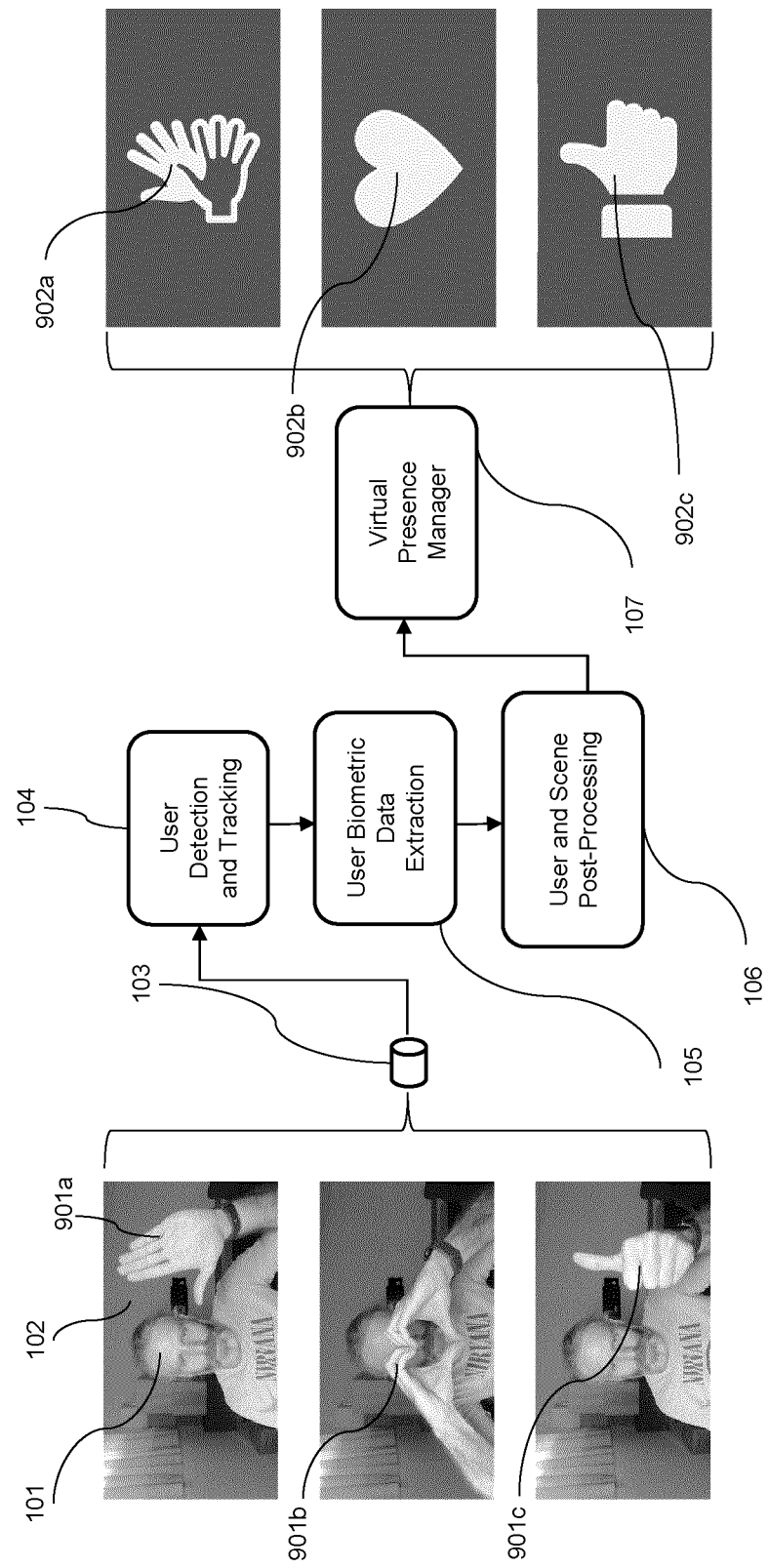
FIG. 9 exemplifies the processing steps performed on the user and the surrounding scene, as captured by the imaging module, in order to create based on the user's hand and face gestures, corresponding emojis. The mapped emojis are embedded in the shared content to augment presenter-audience interactions when the presenter chooses to operate in a privacy mode.

Another alternative embodiment, provides privacy and enhanced interactions between the presenter and the audience by converting presenter hand gestures to standardized emojis (FIG. 9). By way of example, with the user 101 imaged by the imaging sensor 103, when the user has the virtual presence manager 107 configured to privacy mode, the user hand gestures (901a, 901b, 901c), as detected and extracted by the user biometric data extraction module 105 and the user and scene post-processing module 106, are correlated by the virtual presence manager 107 to standardized emojis and displayed as the default overlay (902a, 902b, 902c) instead of the virtual presenter overlay 110. In a similar manner, the virtual presence manager 107 is configured to convert detected user 101 facial expressions into the associated emojis and display them as a replacement for the virtual presenter overlay 110 within the content framework 108. In this embodiment, the user is provided with the option to enhance their privacy while sharing content with an audience, while also maintaining a basic level of engagement with said audience.

Figure 10:
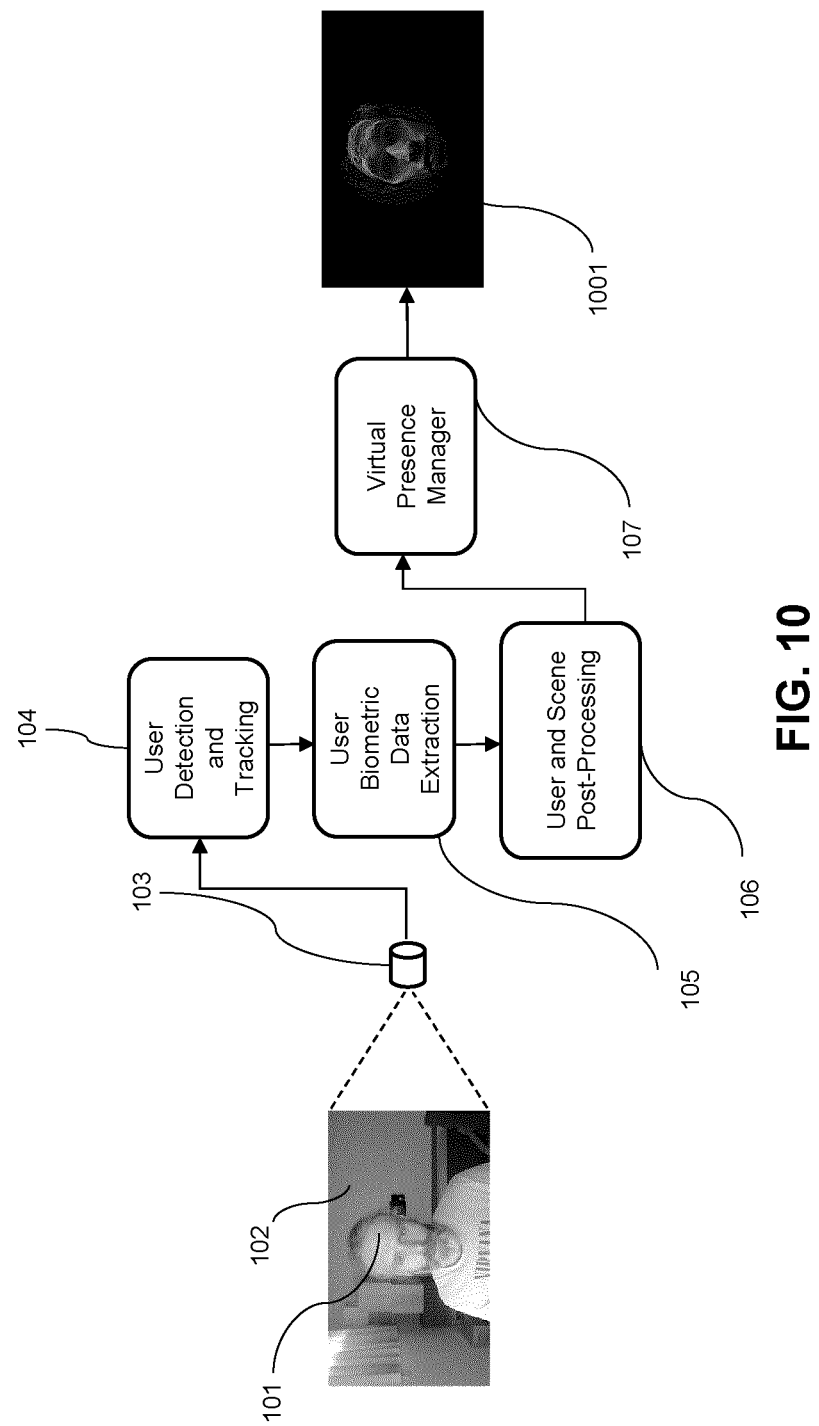
FIG. 10 exemplifies the processing steps performed on the user and the surrounding scene, as captured by the imaging module, in order to create, based on the user's tracked face, a stylized computer-generated virtual representation (avatar) of the presenter. The presenter avatar replaces the presenter foreground in the shared content when the presenter selects to operate in an enhanced privacy mode.

In yet another embodiment, the disclosed system and methods can be used to provide additional privacy to the user while maintaining a high degree of engagement with the audience via a stylized computer-generated virtual representation of the user (FIG. 10). In this instance, the user 101, as imaged by the imaging sensor 103, is first detected and tracked 104 within the scene, prior to the user biometric data extraction 105. Once the user facial biometric features are extracted, the user and scene post-processing module 106 generates stylized computer-generated virtual representation 1001 of the user 101 and forwards it to the virtual presence manager 107. When operating over a decentralized network, where each connected user endpoint runs the methods for enhanced videoconferencing locally, the virtual presence manager can either transmit the stylized computer-generated virtual representation 1001 to the audience or only transmit the associated metadata parameters and allow the virtual presence manager 107 of each connected endpoint to locally generate the stylized computer-generated virtual representation 1001 of the presenter 101. In the latter case, by way of example, the required bandwidth when transmitting over the network just the associated metadata parameters for the stylized computer-generated virtual representation 1001, instead of the virtual presenter foreground 110, may be approximately three times less.

The system and methods for enhanced videoconferencing can be used with a third-party legacy videoconferencing service, where the virtual presence manager 107 provides the communication with the third-party videoconferencing service.

In another embodiment, the enhanced videoconferencing system and methods can be used in real-time remote schooling applications including audience analytics. The audience analytics may include, for example, cognitive engagement metrics, emotion sensing, gaze analysis, user identification, and/or fatigue detection. The audience analytics may provide the presenter 101 with a comprehensive set of tools to improve, for example, assessment of student engagement with presented content, monitoring of student attendance and remote student testing supervision (to e.g. reduce or prevent cheating on tests).

In yet another embodiment, the enhanced videoconferencing system and methods are configured to provide the user with the option to embed watermarking within the shared content, either visible to the audience, invisible or both. By way of example, embedded visible watermarking is used to communicate to the audience the confidentiality level of the shared content, such a "limited distribution" or "strictly confidential". The invisible watermarking may be inserted at the pixel level by the virtual presence manager 107 module, to protect and trace the shared content against unauthorized sharing and distribution. The visible and invisible watermarking may be used alone or in combination, either in live sessions or when sharing recorded content.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the systems and/or devices described herein, any component of or related thereto, or accessible or connectable thereto. Any application or module herein described may be implemented using computer readable/executable instructions that may be stored or otherwise held by such computer readable media.

Although the above principles have been described with reference to certain specific examples, various modifications thereof will be apparent to those skilled in the art as outlined in the appended claims.

The invention claimed is:

1. A system for providing enhanced videoconferencing and remote media content sharing, the system comprising:
   a. at least one imaging module configured to acquire image data of a scene including the user;
   b. a user detection and tracking module configured to extract user anthropometric features based on the image data;
   c. a biometric data extraction module configured to generate, based on the anthropometric features, at least the user's three-dimensional head pose; and
   d. a virtual presence module configured to create a virtual persona of the user and embed said virtual persona in a videoconferencing stream or any of a plurality of remotely shared media content, independent of the videoconferencing or the media recording methods used, and wherein the virtual presence manager is further configured to provide privacy features by converting user hand gestures and facial expressions to their corresponding emojis, and display the emojis instead of the user's virtual presenter overlay.

2. The system of claim 1, further comprising a set of interface controls for adjusting the virtual presenter area within the shared content, wherein adjusting includes one or more of zooming, resizing, moving horizontally and/or vertically, resizing and closing.

3. The system of claim 2, wherein the set of interface controls further comprises virtual presenter controls for pausing the live video feed of the user foreground and replacing it with a still frame of the user or a user avatar.

4. The system of claim 1, wherein the virtual presence module is further configured to dynamically position the virtual presenter area based on temporal evolution of the shared content based on one or more of:
   a. user predefined positions;
   b. an automatic detection process to identify viable positions within the shared content; and
   c. active user inputs, wherein such inputs may be provided via the keyboard, the mouse or through user head, gaze or hand gestures, as extracted by the user biometric data extraction unit.

5. The system of claim 1, wherein the virtual presenter module is further configured to provide a virtual presenter center state mode, wherein the user can dynamically switch from showing the virtual presenter overlaid with the shared content to only showing the virtual presenter using one or more of a manual keyboard or mouse input, and any of a biometric input such as gaze, head pose, user distance with respect to the imaging module.

6. The system of claim 1, further configured to provide videoconferencing over a decentralized network to:
   a. provide the presenter with a view of the audience as a separate overlay within the shared content space, either below or above the shared content area, wherein by default, the audience view is only visible to the presenter; and,
   b. when an audience member interacts with the presenter, by the virtual presence manager, provide a shared center stage view of both the presenter and the audience member.

7. The system of claim 1, wherein the virtual presenter manager is configured to directly record remote content through the virtual presenter manager user interface, and is further configured to save recorded content to one or more local or cloud servers, or to upload recorded content to a distribution platform.

8. The system of claim 1, wherein the virtual presence manager is further configured to provide privacy features, including, but not be limited to: muting the audio of the presenter when the user is looking away from the camera for a set amount of time; muting the audio when the user moves away from the camera beyond a predefined threshold; or removing any other user in the scene, as captured by the imaging device, based on the biometric identification of user as the authenticated user.

9. The system of claim 1, further configured to provide enhanced privacy and interaction features by converting the detected and tracked user three-dimensional head pose into a stylized computer-generated virtual representation of the user, wherein the virtual presence manager replaces the user foreground with the stylized computer-generated virtual representation of the user and embeds it into the shared content.

10. The system of claim 1, further configured to be used in real-time remote schooling applications including audience analytics, the audience analytics including one or more of cognitive engagement metrics, emotion sensing, gaze analysis, user identification, and fatigue detection.

11. The system of claim 1, further configured to provide the user with the option to embed watermarking within the shared content, either visible to the audience, invisible or both.

12. The system of claim 1, wherein the virtual presence manager is further configured to interact with a third-party standalone videoconferencing application in order to provide enhanced videoconferencing functionality.

13. A non-transitory computer readable medium storing instructions for providing enhanced videoconferencing and remote media content sharing, the instructions being executable by one or more processing modules to carry out the method of:
   a. acquire image data of a scene including a user;
   b. extract user anthropometric features based on the image data;
   c. generate, based on the anthropometric features, at least the user's three-dimensional head pose; and
   d. create a virtual persona of the user and embed said virtual persona in a videoconferencing stream or any of a plurality of remotely shared media content, independent of the videoconferencing or the media recording methods used, and
   wherein the method further comprises converting user hand gestures and facial expressions to their corresponding emojis, and displaying the emojis instead of the user's virtual presenter overlay.

14. The non-transitory computer readable medium of claim 13, wherein the method further comprises adjusting the virtual presenter area within the shared content, wherein adjusting includes one or more of zooming, resizing, moving horizontally and/or vertically, resizing and closing.

15. The non-transitory computer readable medium of claim 14, wherein the method further comprises pausing the live video feed of the user foreground and replacing it with a still frame of the user or a user avatar.

16. The non-transitory computer readable medium of claim 1, wherein the method further comprises dynamically positioning the virtual presenter area based on temporal evolution of the shared content based on one or more of:
   a. user predefined positions;
   b. an automatic detection process to identify viable positions within the shared content; and
   c. active user inputs, wherein such inputs may be provided via the keyboard, the mouse or through user head, gaze or hand gestures, as extracted by the user biometric data extraction unit.

17. The non-transitory computer readable medium of claim 13, wherein the method further comprises providing a virtual presenter center state mode, wherein the user can dynamically switch from showing the virtual presenter overlaid with the shared content to only showing the virtual presenter using one or more of a manual keyboard or mouse input, and any of a biometric input such as gaze, head pose, user distance with respect to the imaging module.

18. The non-transitory computer readable medium of claim 17, wherein the method further comprises enabling videoconferencing over a decentralized network to:
   a. provide the presenter with a view of the audience as a separate overlay within the shared content space, either below or above the shared content area, wherein by default, the audience view is only visible to the presenter; and,
   b. when an audience member interacts with the presenter, by the virtual presence manager, provide a shared center stage view of both the presenter and the audience member.

19. The non-transitory computer readable medium of claim 17, the method further comprising directly recording remote content through the virtual presenter manager user interface, and is further configured to save recorded content to one or more local or cloud servers, or to upload recorded content to a distribution platform.

20. The non-transitory computer readable medium of claim 1, the method further comprising muting the audio of the presenter when the user is looking away from the camera for a set amount of time; muting the audio when the user moves away from the camera beyond a predefined threshold; or removing any other user in the scene, as captured by the imaging device, based on the biometric identification of user as the authenticated user.

21. The non-transitory computer readable medium of claim 13, wherein the method further comprises converting the detected and tracked user three-dimensional head pose into a stylized computer-generated virtual representation of the user, wherein the virtual presence manager replaces the user foreground with the stylized computer-generated virtual representation of the user and embeds it into the shared content.

22. The non-transitory computer readable medium of claim 13, wherein the method is applied in real-time remote schooling applications including audience analytics, the audience analytics including one or more of cognitive engagement metrics, emotion sensing, gaze analysis, user identification, and fatigue detection.

23. The non-transitory computer readable medium of claim 13, wherein the method further comprises embedding watermarking within the shared content, either visible to the audience, invisible or both.

24. The non-transitory computer readable medium of claim 13, wherein the method further comprises interacting with a third-party standalone videoconferencing application in order to provide enhanced videoconferencing functionality.

* * * * *